United States Patent [19]

Sugiyama et al.

[11] Patent Number: 4,520,473
[45] Date of Patent: May 28, 1985

[54] SIGNAL PICKUP DEVICE IN A ROTARY RECORDING MEDIUM REPRODUCING APPARATUS

[75] Inventors: Hiroyuki Sugiyama, Isehara; Ryozo Abe, Yokohama; Yasuhiro Yusa, Fujisawa; Masaki Sakurai, Yokohama; Kenji Yoshihara, Chiba, all of Japan

[73] Assignee: Victor Company of Japan, Ltd., Yokohama, Japan

[21] Appl. No.: 322,382

[22] Filed: Nov. 17, 1981

[30] Foreign Application Priority Data

Nov. 21, 1980 [JP] Japan .................... 55-167203[U]

[51] Int. Cl.³ .......................... G11B 9/00; G11B 3/10; G11B 21/24
[52] U.S. Cl. .................... 369/126; 369/292; 369/219; 369/249
[58] Field of Search ........... 369/126, 135, 137, 139, 369/170, 292, 219, 249; 358/342

[56] References Cited

U.S. PATENT DOCUMENTS 4,170,783 10/1979 Tajima ........................ 369/43
4,382,293 5/1983 Tajima et al. ............... 369/139 X
4,423,504 12/1983 Saito et al. .................. 369/219

FOREIGN PATENT DOCUMENTS 2641560 4/1977 Fed. Rep. of Germany .

140507 11/1981 Japan ........................ 369/170

Primary Examiner—Aristotelis M. Psitos
Attorney, Agent, or Firm—Posnack, Roberts, Cohen & Spiecens

[57] ABSTRACT

A signal pickup device in a rotary recording medium reproducing apparatus comprises a turntable placed thereon with a rotary recording medium recorded with an information signal as variations in geometrical configuration, for rotating the rotary recording medium, a reproducing stylus provided at a tip end of a cantilever, for making contact with and sliding against a recorded region of the rotary recording medium upon reproduction to reproduce the information signal, a resonator having a resonance frequency which varies in accordance with the above variations in geometrical configuration, and a conductive ribbon having one end connected to the reproducing stylus and the other end connected to the resonator to electrically connect an electrode of the reproducing stylus with the resonator, where the conductive ribbon is in a curved and bent state upon reproduction of the rotary recording medium. The conductive ribbon has a length such that the conductive ribbon is put into an extended state from the above curved and bent state when the reproducing stylus is lowered below the height position of the rotary recording medium, to restrict the lowering of the reproducing stylus at a height position higher than that of the turntable.

5 Claims, 5 Drawing Figures

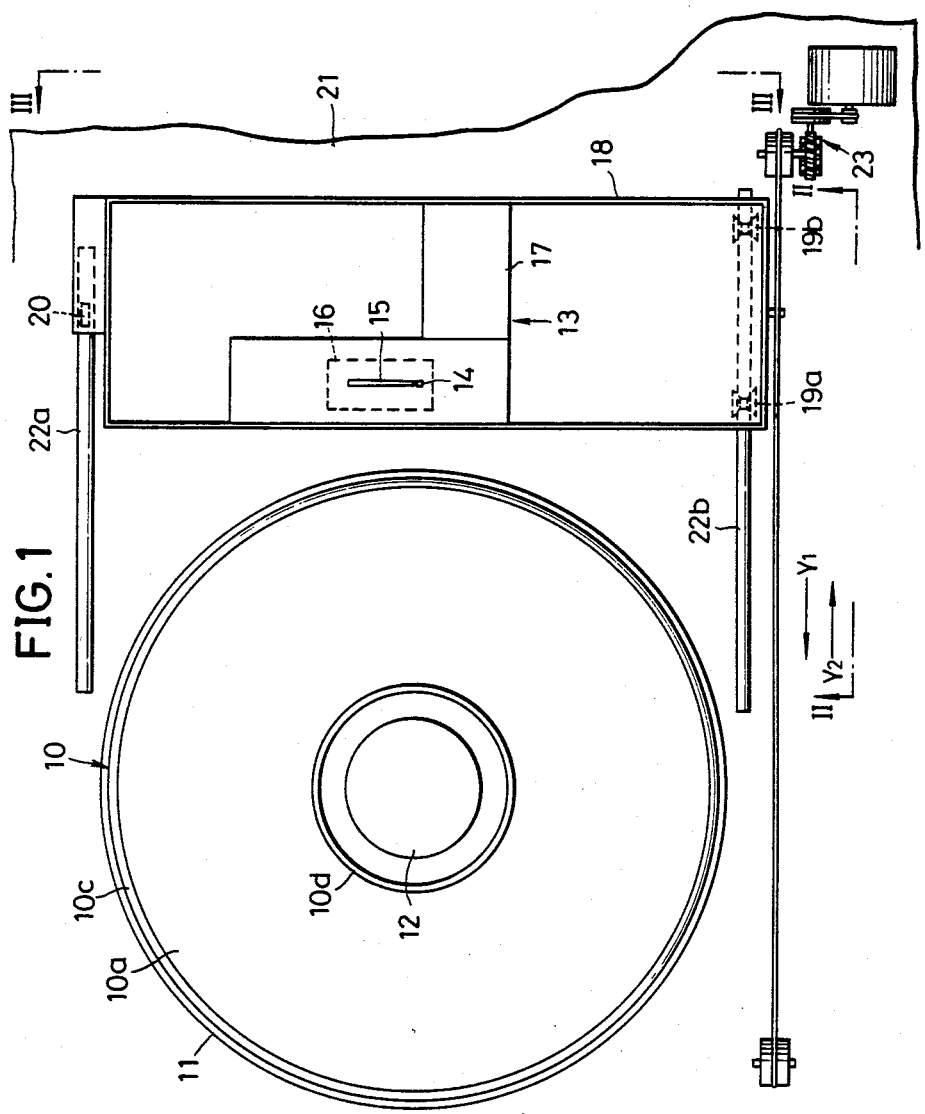

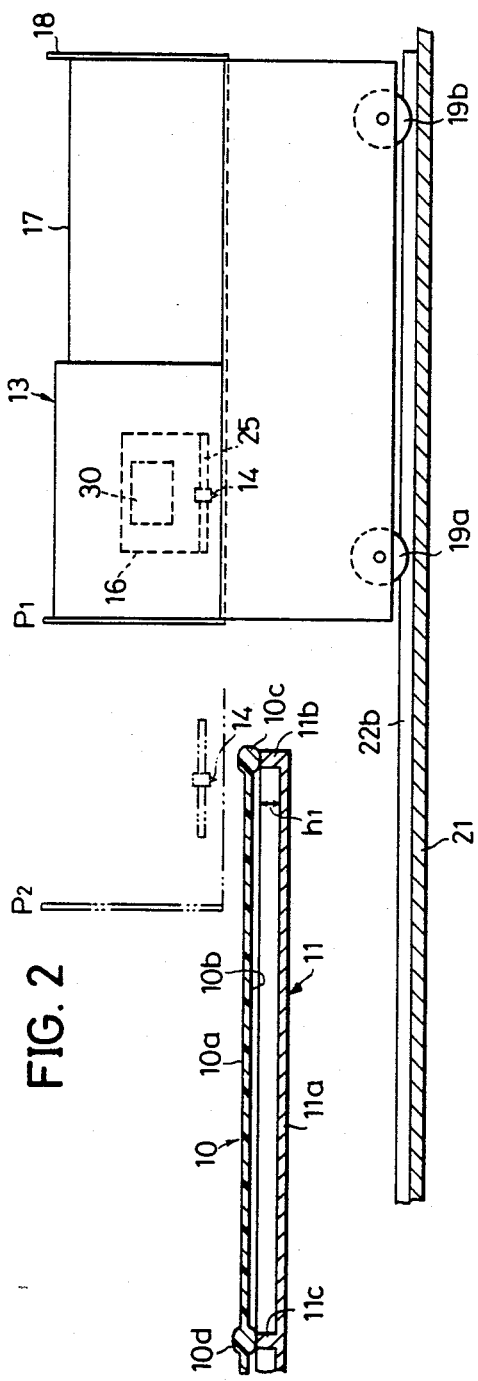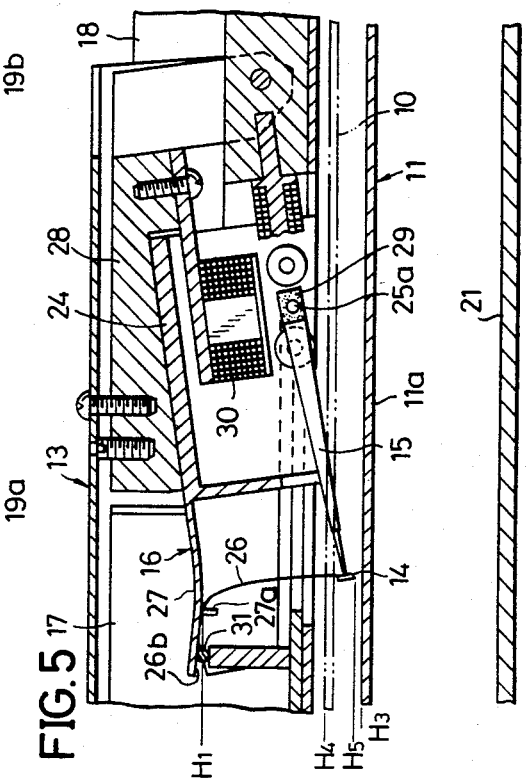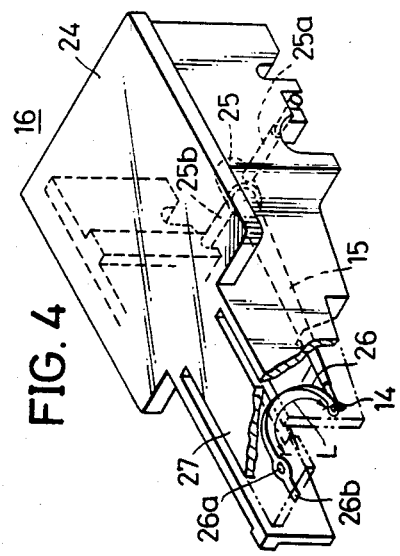

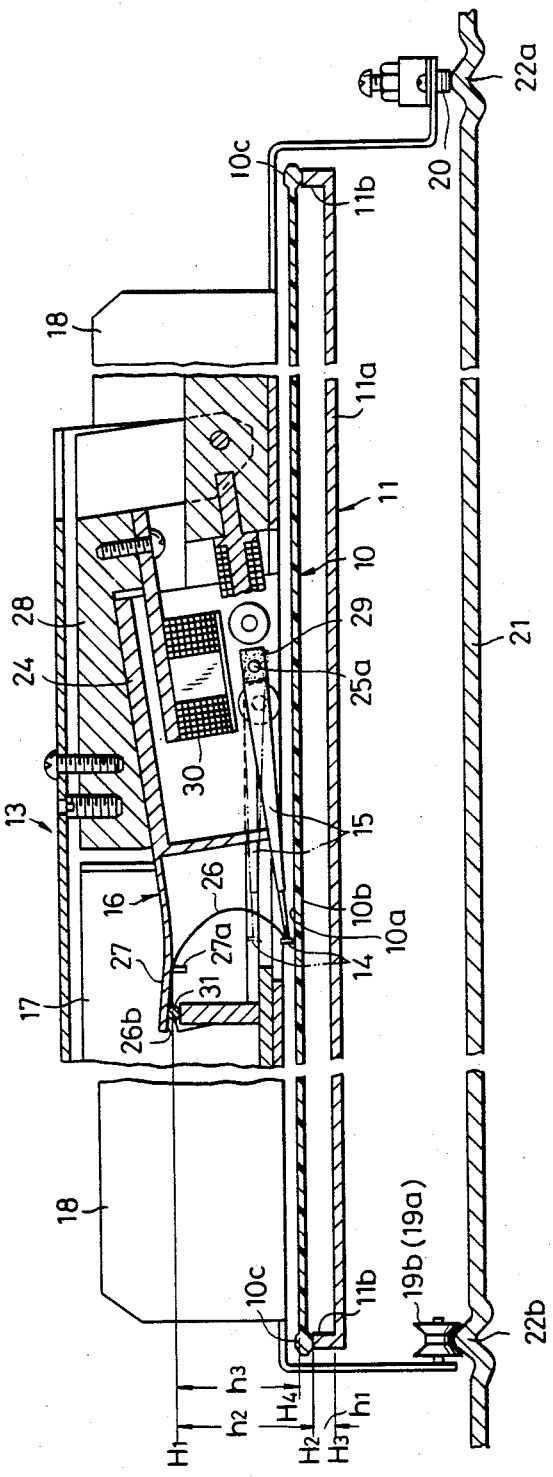

SIGNAL PICKUP DEVICE IN A ROTARY RECORDING MEDIUM REPRODUCING APPARATUS

BACKGROUND OF THE INVENTION

The present invention generally relates to signal pickup devices in rotary recording medium reproducing apparatus, and more particularly to a signal pickup device in which the length of a metal ribbon connecting a reproducing stylus and the resonator is suitably determined so that a most lowered position of the reproducing stylus is at a height position in which the stylus does not make contact with a turntable, to prevent possible damage to the reproducing stylus when the rotary recording medium reproducing apparatus is set to a reproducing mode in the state where a rotary recording medium is not placed onto the turntable.

Conventionally, apparatus for reproducing rotary recording mediums of a so-called electrostatic capacitance type have been reduced to practical use. In this reproducing apparatus, a reproducing stylus makes contact with and slides along a recorded track of the rotary recording medium (hereinafter simply referred to as a disc) in which an information signal such as a video signal is recorded as variations in geometrical configuration, to reproduce the recorded signal as variations in electrostatic capacitance between the disc and an electrode of the reproducing stylus. An example of a signal pickup device used in the above type of a reproducing apparatus consists of a cantilever rotatably supported at a base part side and having a reproducing stylus at the tip end thereof for making contact with and sliding against the disc surface to reproduce a signal, a mechanism for rotating the cantilever upon reproduction and causing the reproducing stylus to make contact with and slide against the disc, a resonator, and a metal ribbon for connecting the reproducing stylus and the resonator in a state where the reproducing stylus can freely move upwards and downwards. The information signal is picked up by virtue of the fact that the resonance frequency of the resonator varies in accordance with the variation in geometrical configuration of the disc surface. In this signal pickup device, the length of the metal ribbon is set so that the metal ribbon is in a slightly curved and bent state when the reproducing stylus makes contact with and slides against the disc surface. Accordingly, the reproducing stylus can freely move upwards and downwards, and the metal ribbon does not interfere with the movement of the reproducing stylus as the reproducing stylus follows and traces the fluctuations in the rotating plane of the disc.

On the other hand, the disc is accommodated within a case with a lid, and the disc is placed onto the turntable within the reproducing apparatus by a loading operation in which the case accommodating the disc is inserted into and then pulled out (extracted) from the reproducing apparatus. Moreover, the reproducing apparatus detects the loading of the disc onto the turntable, indirectly, by detecting that the lid of the case is locked at an innermost part of the reproducing stylus. Hence, in a case where an insertion and extraction operation is performed with respect to an empty case provided with a lid not accommodating a disc, for example, or in such a case where the case is extracted in a state accommodating the disc although the lid is locked within the reproducing apparatus by the insertion and extraction of a normal case accommodating a disc, the reproducing apparatus detects that the disc is loaded, although in reality, the disc may not be loaded onto the turntable. Under such circumstances, the reproducing apparatus operates in a manner identical to when a disc is loaded onto the turntable. Thus, the signal pickup device moves towards the turntable, and the reproducing stylus is lowered. Conventionally, special considerations were not given with respect to the length of the metal ribbon and the size and shape of the turntable. Therefore, the reproducing stylus is lowered below a reference height position during reproduction, into a position where the reproducing stylus makes contact with the upper surface of the turntable. This can instantly damage the reproducing stylus to such extent that the reproducing stylus cannot be used again, when the reproducing stylus rubs against the upper surface of the turntable.

SUMMARY OF THE INVENTION

Accordingly, it is a general object of the present invention to provide a novel and useful signal pickup device in a rotary recording medium reproducing apparatus, in which the above described disadvantages have been overcome.

Another and more specific object of the present invention is to provide a signal pickup device in a rotary recording medium reproducing apparatus, in which the length of a conductive ribbon connecting a reproducing stylus and a resonator in a state where the reproducing stylus can move upwards and downwards is set to a length shorter than that of the conventional ribbon, so that the conductive ribbon extends substantially linearly before the reproducing stylus reaches a height position of a turntable, to restrict the most lowered position of the reproducing stylus to a position higher than that of the turntable. According to the device of the present invention, even when the reproducing apparatus is operated in a state where a rotary recording medium is not placed onto the turntable, accidents are prevented in which the reproducing stylus strikes against the turntable and is damaged.

Other objects and further features of the present invention will be apparent from the following detailed description when read in conjunction with the accompanying drawings.

BRIEF DESCRIPTION OF THE DRAWINGS

FIG. 1 is a general plan view showing a rotary recording medium reproducing apparatus provided with an embodiment of a signal pickup device according to the present invention;

FIG. 2 is an elevation view showing the apparatus in FIG. 1 along line II—II therein;

FIG. 3 is an elevation view showing the apparatus shown in FIG. 1 along line III—III therein upon reproduction of a rotary recording medium;

FIG. 4 is a perspective view showing a pickup cartridge attached as shown in FIG. 3; and FIG. 5 is an elevation view corresponding to FIG. 3 showing a state where a reproducing stylus is lowered when a rotary recording medium is not placed onto a turntable.

DETAILED DESCRIPTION

In FIGS. 1 through 3, a disc 10 is placed onto a turntable 11, and clamped by a clamper 12. The disc is rotated at a predetermined rotational speed. Groove guards 10c and 10d are respectively provided at an outermost peripheral edge part and an innermost peripheral part of the disc 10, so that recorded regions 10a and 10b of the disc 10 do not make contact with the turntable 11. An information signal such as a video signal and an audio signal is recorded in the above recorded regions 10a and 10b.

A signal pickup device 13 consists of a cartridge 16 shown in FIG. 4, a coaxial resonator 17, and the like, and is mounted on a carriage 18. The cartridge 16 has a cantilever 15 provided with a reproducing stylus 14 at a tip end thereof. The carriage 18 has a pair of rollers 19a and 19b respectively provided with a groove, mounted at a flange part on one side thereof, and a roller 20 mounted at a flange part on the other side thereof. These rollers 19a, 19b, and 20 are provided in a freely rotatable manner. The roller 20 rolls on a rail 22a provided on a chassis 21 of a reproducing apparatus, while the rollers 19a and 19b roll on a rail 22b. Accordingly, the carriage 18 is transferred towards the directions of arrows Y1 and Y2 by a transferring mechanism 23.

The turntable 11 consists of a circular plate part 11a and ring-shaped projecting walls 11b and 11c provided at the outer peripheral part and the inner peripheral part thereof. The heights of these ring-shaped projecting walls 11b and 11c are higher than those of the conventional ring-shaped projecting walls. The distance between the vertex plane of the projecting walls 11b and 11c and the upper surface of the circular plate part 11a is indicated by h1.

In the cartridge 16, a rear end part of the cantilever 15 is held between a pair of arm parts 25a and 25b of a suspension 25 made of rubber. The arm parts 25a and 25b are provided in a bridging manner, at a cartridge case 24. A metal ribbon 26 consitutes an essential part of the device according to the present invention. A hole provided at one end of the metal ribbon 26 is fitted over the reproducing stylus 14 and fixedly adhered in a state where the metal ribbon 26 is connected to an electrode of the reproducing stylus 14. On the other hand, a hole 26a provided in the other end of the metal ribbon 26 is fitted over a projection 27a of an arm-shaped top plate 27, and fixed to the cartridge case 24. A pad part 26b is positioned at the lower surface of the arm-shaped top plate 27. The metal ribbon 26 is an extremely thin gold-plated phosphor bronze foil having a length L which is shorter than that of the conventional ribbon. The metal ribbon has no spring characteristics, and does not function as an ordinary leaf spring, because of the extremely thin thickness.

As shown in FIG. 3, the cartridge 16 is attached in a state inserted into a guide member 28. In this attached state, a permanent magnet piece 29 fitted into the rear end part of the cantilever 15 opposes a stylus pressure applying coil 30. The reproducing stylus 14 and the cantilever 15 are raised as indicated by a two-dot chain line in FIG. 3, and are drawn inwards within the carriage 18. Furthermore, the pad part 26b of the metal ribbon 26 presses against a central conductor 31 of the resonator 17. The central conductor 31 is perched on a vertical member of the resonator 17. The cartridge 16 is mounted in a state where the height position thereof is restricted by means of the central conductor 31. The central conductor 31 thus serves to determine a height position H1 described hereinafter.

A difference in height between height position H1 of a base part of the projection 27a where the metal ribbon 26 is fixed, and a height position H2 of the vertex plane of the projecting walls 11b and 11c of the turntable 11, is designated by h2. Hence, a difference in height between the height position H1 and a height position H3 of the upper surface of the circular plate part 11a of the turntable 11, becomes (h1+h2). Moreover, a difference in height between the height position H1 and a height position H4 of the surface of the recorded region 10a to be reproduced of the disc 10 which is placed onto the turntable 11 in a state where the groove guards 10c and 10d are respectively engaged with the corresponding projecting walls 11b and 11c, is designated by h3. The length L of the metal ribbon 26 is set to the length satisfying a relation $h3 < L < (h1+h2)$. As a concrete example, when h1=4.9 milimeters and H2=17 milimeters (h3=14.9 milimeters when the external size of the disc 10 is considered), L=21 milimeters. Hence, as will be described hereinafter, the metal ribbon 26 is still in a curved and bent state as shown in FIG. 4 in the case where the reproducing stylus 14 is lowered when the reproducing stylus 14 is at a reference height position H4. In this state, the reproducing stylus 14 can be further lowered by a slight amount. When the reproducing stylus 14 is lowered below the height position H4, the metal ribbon 26 is fully extended to a substantially linear manner at a state before the reproducing stylus 14 reaches the height position H4 as shown in FIG. 5. Accordingly, the reproducing stylus 14 is restricted from being further lowered. In the above described concrete example, the most lowered height position H5 of the reproducing stylus 14 is a position higher than the upper surface of the circular plate part 11a of the turntable 11 by 0.9 milimeters.

Next, description will be given with respect to the operation of the device having the above described construction.

When a play operation is performed in a state where the disc 10 is placed onto the turntable 11, the turntable 11 rotates in the clockwise direction and the carriage 18 moves in the direction of the arrow Y1 from a waiting position P1. A current is supplied to the coil 30 when the carriage 18 reaches a lead-in position P2. Moreover, a rotational force in the counterclockwise direction in FIG. 3 is generated by the permanent magnet piece 29. Thus, the cantilever 15 is rotated in a counterclockwise direction to a position indicated by the solid lines in FIG. 3, causing twisting deformation in the arms 25a and 25b of the suspension 25, and the reproducing stylus 14 is accordingly lowered. The reproducing stylus 14 makes contact with the recorded region 10a of the disc 10 with a predetermined stylus pressure. Accordingly, the rotating disc 10 is relatively scanned by the reproducing stylus 14, and the information signal in the recorded region 10a of the disc 10 is reproduced as in the conventional apparatus. In this state, the metal ribbon 26 is curved to some extent. In addition, the reproducing stylus 14 moves upwards and downwards about the height position H4, to follow and trace in accordance with the fluctuations in the rotating plane of the disc 10.

Next, description will be given with respect to operation of the above device, in the case where the disc 10 is actually not placed onto the turntable 11 although the reproducing apparatus has detected that the disc 10 is in a loaded state as described above.

In this case, similarly as in the above described case, the carriage 18 moves in the direction of the arrow Y1 when the play operation is performed. Moreover, current is supplied to the coil 30, and the reproducing stylus 14 is lowered, at the lead-in position P2.

However, since the disc 10 is not on the turntable 11, the reproducing stylus 14 is further lowered below the reference height position H4. The reproducing stylus 14 is lowered while changing the curve state of the metal ribbon 26 into a state closer to a linear state. The length L of the metal ribbon 26 is determined as described above, and as shown in FIG. 5, the metal ribbon 26 is fully extended to a substantially linear state when the reproducing stylus 14 is lowered to a height position slightly higher than the height position H3. The reproducing stylus 14 is accordingly restricted from being further lowered. Therefore, the reproducing stylus 14 is maintained at the most lowered height position H5 in slightly separated relation from the upper surface of the circular plate part 11a of the turntable 11, and does not make contact with the turntable 11. Thus, accidents in which the reproducing stylus 14 is damaged by the contact between the turntable 11 as in the conventional apparatus, is prevented by the above construction. The reproducing apparatus is hence put into a state where a reproduced signal is not produced although the reproducing operation is started.

The strength of the metal ribbon 26 is selected so that the metal ribbon 26 can be extended from the curved state without introducing breakage. In addition, a fixing method is employed such that the metal ribbon 26 and the reproducing stylus 14 do not separate.

Moreover, other methods may be considered to restrict the most lowered height position of the reproducing stylus 14 so that the reproducing stylus 14 does not make contact with the turntable 11. One such method is to provide a stopper for stopping the cantilever 15 when the cantilever 15 excessively rotates in the counterclockwise direction, or in another method, a projection may be provided on the core of the stylus pressure applying coil 30 to stop the permanent magnet piece 29. However, in the present embodiment of the invention, the metal ribbon 26 which electrically connects the electrode of the reproducing stylus 14 to the coaxial resonator 17 restricts the most lowered height position of the reproducing stylus 14. Hence, the construction of the device is extremely simple.

When the reproducing apparatus is in a state where the reproduced signal is not produced although the reproducing apparatus is in a reproducing mode, and continues to be in that state, the operational mode of the reproducing apparatus is automatically changed over to an eject mode. Accordingly, the supply of current to the coil 30 is interrupted, and the reproducing stylus 14 is raised. In addition, the carriage 18 is returned towards the direction of the arrow Y2 to the original waiting position P1 by the transferring mechanism 23.

In the above embodiment of the invention, the turntable 11 employed has the projecting walls 11b and 11c for receiving the groove guards 10c and 10d. Hence, the difference in height between the height positions H2 (H3) and H4 becomes relatively large. Accordingly, the present invention may be realized without strictly determining the length L of the metal ribbon 26. Furthermore, by considering the fact that the operation to lower the reproducing stylus 14 in a state where the disc 10 is not placed onto the turntable 11 is only performed when the carriage 18 is at the lead-in position P2, the turntable 11 may be shaped so as to have a particularly deep ring-shaped groove at a part corresponding to the above lead-in position P2.

Further, the present invention is not limited to these embodiments, but various variations and modifications may be made without departing from the scope of the present invention.

What is claimed is:

1. A signal pickup device in a rotary recording medium reproducing apparatus comprising:
    a turntable for placement thereon of a rotary recording medium recorded with an information signal as variations in geometrical configuration, for rotating the rotary recording medium;
    a cartridge including a cantilever having a tip end with a reproducing stylus at said tip end for making contact with and sliding against a recorded region of said rotary recording medium upon reproduction to reproduce the information signal;
    a resonator having a resonance frequency which varies in accordance with the above variations in geometrical configuration;
    a conductive ribbon having one end connected to said reproducing stylus and the other end connected to said resonator to electrically connect an electrode of said reproducing stylus with said resonator, said conductive ribbon being in a curved and bent state upon reproduction of said rotary recording medium, and
    means for restricting said cartridge at a predetermined height position at the location where the other end of said conductive ribbon is electrically connected to said resonator,
    said conductive ribbon having a length such that said conductive ribbon is put into an extended state from said curved and bent state when said reproducing stylus is lowered below the height position of said rotary recording medium, to restrict the lowering of said reproducing stylus at a height position higher than that of said turntable,
    said turntable comprising a projecting wall for supporting an outer peripheral groove guard of said rotary recording medium at an outer periphery thereof, and a circular plate part opposing the recorded region of said rotary recording medium, said circular plate part having an upper surface which is lower than a vertex plane of said projecting wall.

2. A signal pickup device as claimed in claim 1 in which said conductive ribbon is a foil-like ribbon which is thin to an extent such that said conductive ribbon has no spring characteristic.

3. A signal pickup device as claimed in claim 1 in which said cantilever is supported within a cartridge case of said cartridge, and said conductive ribbon has one end fixed to a top plate of said cartridge case.

4. A signal pickup device as claimed in claim 1 in which said conductive ribbon has a length such that in a state where said reproducing stylus can be freely lowered, the tip end of said reproducing stylus is lower than the height position of the recorded region surface to be reproduced of said rotary recording medium placed onto the projecting wall of said turntable, and higher than the height position of the upper surface of said circular plate part of said turntable.

5. A signal pickup device as claimed in claim 1, in which said resonator comprises a central conductor which is fixed at a determined position, said other end of the conductive ribbon pressing against said central conductor, said means for restricting the cartridge height position comprising said central conductor.

* * * * *